US010748957B1

(12) United States Patent
McKnight et al.

(10) Patent No.: US 10,748,957 B1
(45) Date of Patent: Aug. 18, 2020

(54) METHOD OF MANUFACTURING A CURVED SEMICONDUCTOR DIE

(71) Applicant: HRL LABORATORIES, LLC, Malibu, CA (US)

(72) Inventors: Geoffrey P. McKnight, Los Angeles, CA (US); Andrew C. Keefe, Encino, CA (US); Alexander R. Gurga, Canoga Park, CA (US); Ryan Freeman, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/388,037

(22) Filed: Apr. 18, 2019

Related U.S. Application Data

(60) Provisional application No. 62/688,171, filed on Jun. 21, 2018.

(51) Int. Cl.
*H01L 21/027* (2006.01)
*H01L 27/146* (2006.01)
*G06F 30/23* (2020.01)
*G06F 111/10* (2020.01)
*G06F 119/18* (2020.01)

(52) U.S. Cl.
CPC ........ *H01L 27/14683* (2013.01); *G06F 30/23* (2020.01); *G06F 2111/10* (2020.01); *G06F 2119/18* (2020.01)

(58) Field of Classification Search
CPC combination set(s) only.
See application file for complete search history.

(56) References Cited

U.S. PATENT DOCUMENTS

2006/0038182 A1\* 2/2006 Rogers ................ H01L 27/1285
257/77
2018/0061906 A1\* 3/2018 Kim .................... H01L 27/3272

\* cited by examiner

*Primary Examiner* — Mohammad M Choudhry
(74) *Attorney, Agent, or Firm* — Lewis Roca Rothgerber Christie, LLP

(57) ABSTRACT

A method of manufacturing a curved semiconductor die includes: designing a semiconductor die design by conducting finite element analysis of an initial semiconductor die design having a partial spherical curvature, the initial semiconductor die design including a shape of a semiconductor die and a location and shape of a slit in the semiconductor die; when a size of a gap at the slit in the curved semiconductor die is outside a tolerance, modifying the initial semiconductor die design to provide a revised semiconductor die design and conducting another finite element analysis thereof; when the size of the gap at the slit in the curved semiconductor die is within the tolerance, manufacturing a microfabrication mask utilizing the initial semiconductor die design or the revised semiconductor die design having the size of the gap within the tolerance; forming a semiconductor die by utilizing the microfabrication mask; and curving the semiconductor die.

20 Claims, 6 Drawing Sheets
(2 of 6 Drawing Sheet(s) Filed in Color)

METHOD OF MANUFACTURING A CURVED SEMICONDUCTOR DIE

CROSS-REFERENCE TO RELATED APPLICATION

The present application claims priority to and the benefit of U.S. Provisional Patent Application Ser. No. 62/688,171, filed on Jun. 21, 2018, the entire content of which is incorporated herein by reference.

STATEMENT REGARDING FEDERALLY SPONSORED RESEARCH OR DEVELOPMENT

This invention was made with U.S. Government support under Contract No. 2017-17033000004 awarded by the Intelligence Advanced Research Projects Activity (IARPA). The U.S. Government has certain rights to this invention.

BACKGROUND

1. Field

Aspects of embodiments of the present disclosure relate to a method of manufacturing a curved semiconductor die. Additional aspects of embodiments of the present disclosure relate to a method of manufacturing a partially spherically curved focal-plane array (FPA).

2. Description of Related Art

Imaging detectors (e.g., imaging sensors) are used in imaging devices and generally include an array of light-sensing pixels arranged at the focal plane of an optical lens. The imaging detector may be a complementary metal-oxide-semiconductor (CMOS) sensor and/or a charge-coupled device (CCD) sensor for imaging systems (e.g., cameras) and/or light detection and ranging (LIDAR) systems. CMOS and CCD sensors are well-suited to detecting light in the visible spectrum but are lackluster at detecting light in the infrared spectrum, so other materials and/or manufacturing techniques may be used to manufacture infrared (IR) imaging detectors, such as stained layer super-lattice (SLS) technology.

Generally, an imaging detector includes a plurality of pixels (e.g., light-sensing pixels) arranged in a matrix including a plurality of rows and columns. The pixels (e.g., the output of the pixels) are read by a circuit, such as a readout integrated circuit (ROIC), which may include a plurality of decoders, according to the rows and columns to determine the amount (e.g., the intensity) of light incident on each of the pixels. For example, a pixel in the third row and tenth column of a FPA may be read by activating (or reading) the third row decoder and the tenth column decoder such that the pixel at the intersection (or crossing) of the third row and the tenth column is read. This may be referred to as the row/column readout method.

Research has recently been conducted into curved semiconductor dies, including curved imaging detectors for use in imaging devices. Compared to related-art flat imaging detectors, curved imaging detectors allow for a wider range of optical lens designs and are able to acquire sharper, more detailed images and may operate at lower light levels, thereby extending the operational window (e.g., the operational parameters) when compared to the related-art flat imaging detectors. Curved imaging detectors, due at least in part to the potential to increase the numerical aperture of the optical lens, gather more illumination intensity on the pixels thereof and, accordingly, may also be capable of acquiring images at a higher frame rate and with less noise than the related-art flat imaging detectors. Curved imaging detectors may be used in, as a few examples, surveillance systems, such as high-powered cameras and/or satellite-based imaging systems, and autonomous devices, such as autonomous vehicles and/or drones.

Various attempts have been made to form curved imaging detectors, one example of an imaging detector is a focal-plane array (FPA). One related art method of manufacturing a curved imaging detectors includes stitching a mosaic of flat or substantially flat individual FPAs together on a curved die, but this approach requires high detail to the alignment between the different FPAs and is susceptible to misalignment over time and/or at excessive temperatures. This approach also requires a complicated readout method due to the plurality of individual FPAs.

Referring to FIG. 1A, another related-art curved FPA has a plurality of petals, such as the petals of a flower. However, with this approach, there is no reliable way to ensure the petals match up to each other when the FPA is curved, and this type of FPA is not amenable to the row/column readout method due to the large disconnected areas between the adjacent petals, necessitating a more complicated and expensive readout method.

Referring to FIG. 1B, another related-art curved FPA includes a patterned silicon approach, in which a plurality of silicon pixels are formed by etching a continuous layer of silicon. Using this method, each pixel can move relatively independently of the other pixels to facilitate the curving of the FPA. But this approach suffers from reduced active sensing area due to the relatively large etched area between the adjacent pixels, and this approach is also not amenable to the row/column readout method, necessitating a more complicated and expensive readout method.

Accordingly, there is a need for a curved semiconductor die suitable for use as an imaging sensor that can be curved to a relatively high degree with reduced or minimal loss in active sensing area while also being amenable to the relatively simple and inexpensive row/column readout method.

SUMMARY

Aspects of embodiments of the present disclosure are directed toward a method of manufacturing a curved semiconductor die. The semiconductor die may a focal-plane array (FPA) for use in an imaging sensor, such as an optical imaging sensor or an infrared imaging sensor. To improve the curving behavior of the semiconductor die, one or more slits may be formed in the semiconductor die. The method of manufacturing the curved semiconductor die may include determining an initial slit pattern, conducting a finite element analysis (or simulation) on the semiconductor die with the initial slit pattern, estimating the gap at the slits, modifying the initial slit pattern in view of the estimated gap, and conducting another finite element analysis on the semiconductor die with the modified slit pattern. By iteratively modifying the slit pattern in view of finite element analysis results, an optimal slit pattern can be developed to manufacture a curved semiconductor die with reduced gap before a semiconductor die is formed and curved, thereby reducing costs and time necessary to design a curved semiconductor die. After the optimal slit pattern is determined, a microfabrication mask is produced according to the slit pattern to etch the slit pattern into a semiconductor die, and then the etched semiconductor die is curved to have the desired curvature.

According to an embodiment of the present disclosure, a method of manufacturing a curved semiconductor die includes: designing a semiconductor die design by conducting finite element analysis of an initial semiconductor die design having a partial spherical curvature, the initial semiconductor die design including a shape of a semiconductor die and a location and shape of a slit in the semiconductor die; when a size of a gap at the slit in the curved semiconductor die is outside a tolerance, modifying the initial semiconductor die design to provide a revised semiconductor die design and conducting another finite element analysis of the revised semiconductor die design; when the size of the gap at the slit in the curved semiconductor die is within the tolerance, manufacturing a microfabrication mask utilizing the initial semiconductor die design or the revised semiconductor die design having the size of the gap within the tolerance; forming a semiconductor die by utilizing the microfabrication mask; and curving the semiconductor die to have the partial spherical curvature.

The method may further include iteratively modifying the initial semiconductor die design and conducting the finite element analysis until the size of the gap at the slit is within the tolerance.

The forming of the semiconductor die may include etching the semiconductor die.

The curving of the semiconductor die may include pneumatic curving.

The initial semiconductor die design may further include lateral dimensions of the semiconductor die, thickness of the semiconductor die, and the partial spherical curvature.

The shape of the slit may include a cone portion and a circular portion.

A radius of the circular portion of the slit may be greater than one-half a width of the cone portion at where the cone portion meets the circular portion.

The modifying of the initial semiconductor die design may include modifying the shape of the slit.

The modifying of the initial semiconductor die design may include modifying the location of the slit.

The modifying of the location of the slit may include modifying an offset from a terminus of the slit to a center of the semiconductor die.

According to an embodiment of the present disclosure, a method of manufacturing an imaging device includes: conducting a first finite element analysis on a curved semiconductor die design including a slit; estimating a size of a gap in the curved semiconductor die design at the slit by utilizing the first finite element analysis; when the size of the gap is greater than a tolerance: modifying a shape and/or a location of the slit in the curved semiconductor die design and conducting a second finite element analysis; and estimating the size of the gap in the curved semiconductor die design at the slit by utilizing the second finite element analysis; and when the size of the gap is less than the tolerance, manufacturing a focal-plane array according to the curved semiconductor die design or the modified curved semiconductor die design having the gap that is less than the tolerance.

The manufacturing of the focal-plane array may include manufacturing a microfabrication mask according to the curved semiconductor die design or the modified curved semiconductor die design having the gap that is less than the tolerance and etching a semiconductor die by utilizing the microfabrication mask.

The etching of the semiconductor die may include etching a plurality of pixel definition grooves and the slit in the semiconductor die.

The pixel definition grooves may have a depth that is less than a thickness of the semiconductor die, and the slit may extend through the semiconductor die.

The focal-plane array may include a plurality of pixels, and the tolerance may be equal to or less than a pitch between two adjacent ones of the pixels.

According to an embodiment of the present disclosure, a method of manufacturing a curved semiconductor die includes: designing a semiconductor die design by conducting a finite element analysis simulation of curving an initial semiconductor die design from a flat state into a curved state having a partial spherical curvature, the initial semiconductor die design including lateral dimensions of a semiconductor die, shape and location of a slit in the semiconductor die, and a radius of the partial spherical curvature of the semiconductor die; measuring a gap at the slit in the simulated curved semiconductor die design according to the initial semiconductor die design; when the gap is outside a tolerance, modifying the initial semiconductor die design to provide a first revised semiconductor die design, conducting another finite element analysis simulation utilizing the first revised semiconductor die design, and measuring the gap at the slit in the simulated curved semiconductor die design according to the first revised semiconductor die design; and manufacturing a curved semiconductor die according to the initial semiconductor die design when the gap at the slit of the initial semiconductor die design is within the tolerance or according to the first revised semiconductor die design when the gap at the slit of the initial semiconductor die design is outside the tolerance and the gap at the slit of the first revised semiconductor die design is within the tolerance.

The manufacturing of the curved semiconductor die may include: forming a microfabrication mask having a plurality of openings therein; etching a semiconductor die by utilizing the microfabrication mask; and curving the etched semiconductor die.

The etching of the semiconductor die may include etching a slit through the semiconductor die.

The curving of the etched semiconductor die may include a pneumatic curving process.

The method may further include, when the gap at the slit of the first revised semiconductor die design is outside the tolerance, modifying the first revised semiconductor die design to provide a second revised semiconductor die design, conducting another finite element analysis simulation utilizing the second revised semiconductor die design, and measuring the gap at the slit in the simulated curved semiconductor die design according to the second revised semiconductor die design.

BRIEF DESCRIPTION OF THE DRAWINGS

The patent or application file contains at least one drawing executed in color. Copies of this patent or patent application publication with color drawings will be provided by the Office upon request and payment of the necessary fee.

These and other aspects and features of the present disclosure will be further appreciated and better understood with reference to the specification, claims, and appended drawings, in which:

DETAILED DESCRIPTION

The detailed description set forth below in connection with the appended drawings is intended as a description of example embodiments of the present disclosure and is not intended to represent the only forms in which the present disclosure may be embodied. The description sets forth aspects and features of the present disclosure in connection with the illustrated embodiments. It is to be understood, however, that the same or equivalent aspects and features may be accomplished by different embodiments, and such other embodiments are encompassed within the spirit and scope of the present disclosure. As noted elsewhere herein, like element numbers in the description and the drawings are intended to indicate like elements. Further, descriptions of features, configurations, and/or other aspects within each embodiment should typically be considered as available for other similar features, configurations, and/or aspects in other embodiments.

Figure 1A:
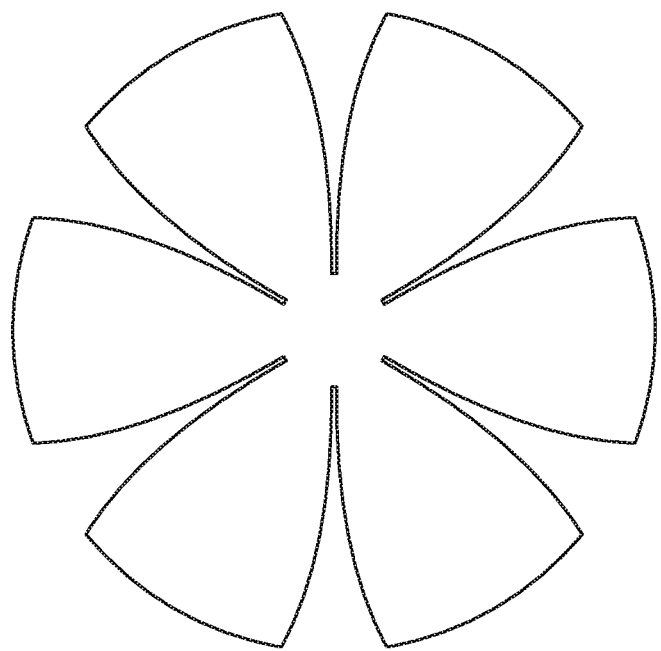
FIGS. 1A and 1B are schematic illustrations of curved semiconductor dies according to the related art.
Figure 1B:
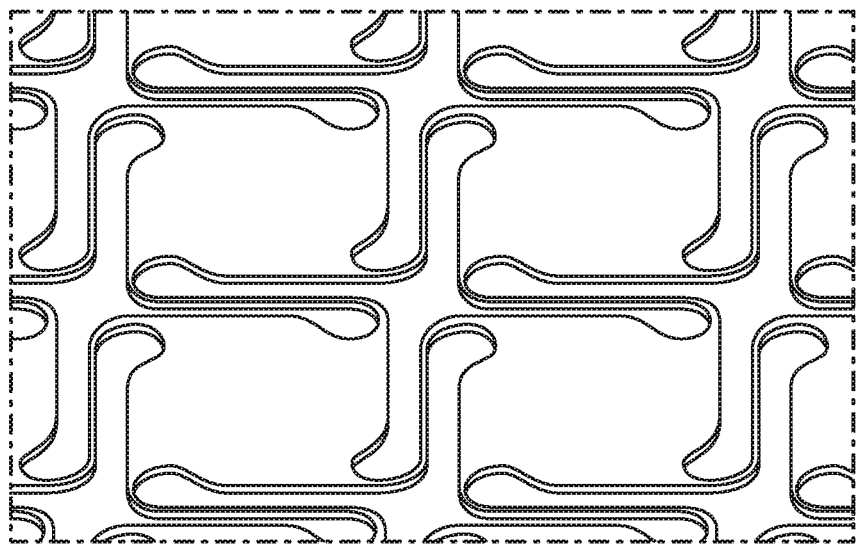
Figure 2:
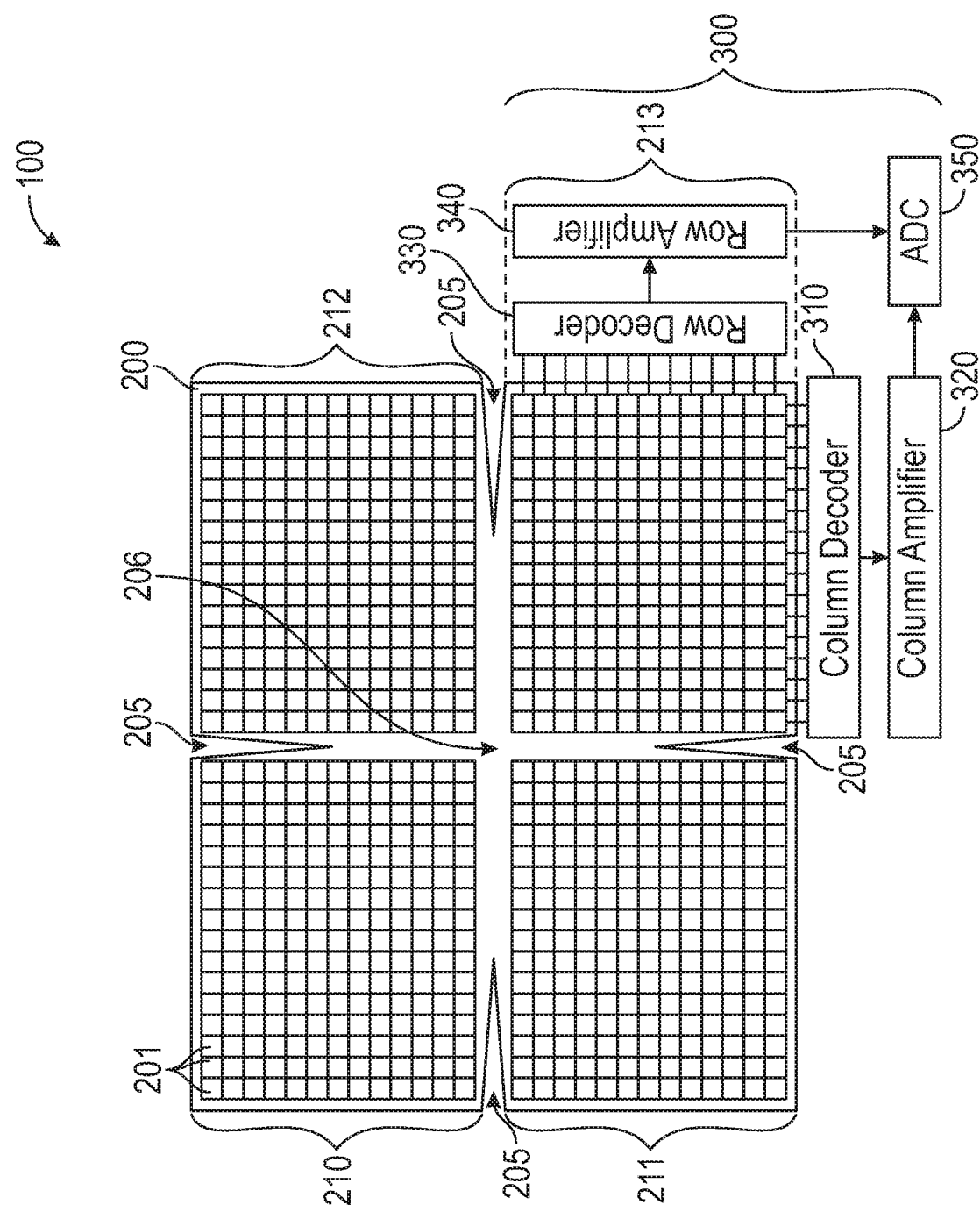
FIG. 2 is a schematic illustration of an imaging device in a flat state according to an embodiment of the present disclosure.

Referring to FIG. 2, an imaging device 100 includes a semiconductor die 200 and a readout circuit 300. In FIG. 2, the semiconductor die 200 is shown in a flat state for ease of description but, in a final state, the semiconductor die 200 is curved to have a partially spherical shape. In the illustrated embodiment, the semiconductor die 200 is shown as a focal-plane array (FPA), but the present disclosure is not limited thereto. Further, the semiconductor die 200 is shown as having a rectangular shape, but the present disclosure is not limited thereto.

The focal-plane array includes the semiconductor die (e.g., a detector die) 200 on which a plurality of pixels (e.g., light-sensing pixels) 201 are formed. In some embodiments, the pixels 201 may be spaced from each other by pixel definition grooves (see, e.g., 202 in FIG. 6B), but in other embodiments, such as in silicon-based focal-plane arrays, no such pixel definition grooves are present. In embodiments in which there are no pixel definition grooves, adjacent pixels may be uninterrupted except as by slits, further described below, so that in certain areas, for example in the central area, the pixel array is continuous or substantially uninterrupted. The pixels 201 may be arranged in a matrix including a plurality of rows and columns. In some embodiments, the pixel pitch (e.g., the distance from the center of one pixel 201 to the center of an adjacent pixel 201) may be in a range of about four microns to about five microns, and the semiconductor die 200 may have lateral dimensions (e.g., may have a length and a width) in a range of about 20 mm to about 30 mm.

The focal-plane array includes a plurality of pixel portions. For example, in the illustrated embodiment, the focal-plane array includes four pixel portions 210-213. The pixel portions 210-213 may be separated from each other by slits (e.g., stress relieving slits) 205 and/or an open area 206. As discussed above, in some embodiments, the pixels 201 may be uninterrupted except as by the slits 205 so that in certain areas, for example in the central area, the pixel array is continuous or is substantially uninterrupted. The number of slits 205 is not particularly limited. Increasing the number of slits 205 in the semiconductor die 200 decreases stress in the semiconductor die 200 during the curving process but necessitates a more complicated readout circuit.

The slits 205 may be physical slits extending through the semiconductor die 200, and the slits 205 may extend from an edge of the semiconductor die 200 toward a center thereof along (e.g., parallel to) the row direction of the pixels 201 or along (e.g., parallel to) the column direction of the pixels 201. The open area 206 is an area of the semiconductor die 200 on which pixels 201 are not arranged. For example, when the semiconductor die 200 is curved, the open area 206 may be creased or wrinkled, such that any pixels that would have been formed thereon would not receive any light or would output a distorted signal due to light being incident thereon at an irregular angle.

The pixels 201 are each connected to one or more column decoders 310 and one or more row decoders 330. For example, the readout circuit 300 may include a plurality of column decoders 310 and a plurality of row decoders 330, and the number of the column and row decoders 310/330 may correspond to the number of pixel portions 210-213. Thus, the illustrated embodiment may include four column decoders 310 and four row decoders 330, one for each of the pixel portions 210-213, but the present disclosure is not limited thereto. In other embodiments, only one column decoder 310 and only one row decoder 330 may be included in the readout circuit 300 to reduce costs.

The column decoders 310 may be connected to a column amplifier 320, and the row decoders 330 may be connected to a row amplifier 340. The column and row amplifiers 320/340 may amplify the electric signals received from each of the pixels 201 via the column and row decoders 310/330. In some embodiments, the readout circuit 300 may include a plurality of column amplifiers 320 and a plurality of row amplifiers 340. For example, the number of column amplifiers 320 may correspond to the number of column decoders 310, and the number of row amplifiers 340 may correspond to the number of row decoders 330, but the present disclosure is not limited thereto. In other embodiments, a plurality of column decoders 310 may be connected to a single column amplifier 320, and a plurality of row decoders 330 may be connected to a single row amplifier 340.

After the electric signals from the pixels 201 are amplified by the column and row amplifiers 320/340, they are transmitted to an analog-to-digital converter (ADC) 350. The ADC 350 converts the analog signals received from the pixels 201 into digital signals for transmission to other devices and for further processing.

By including the slits 205 and the open area 206 in the semiconductor die 200, the semiconductor die 200 may be curved to a relatively high degree without suffering wrinkling or buckling by reducing die stress during curving. However, to use the row/column readout method, the slits 205 may only partially extend from an edge of the semiconductor die 200 toward a center of the semiconductor die 200. For example, referring to FIG. 3, the termini of the slits 205 may be offset from center of the semiconductor die 200.

Further, because the slits 205 only partially extend toward the center of the semiconductor die 200, the pixel portions 210-213 may be more easily aligned with respect to each other due the curving process, avoiding a complicated alignment process, such as that used when separate pixel mosaics are stitched together on a curved die.

However, because the slits 205 only partially extend toward the center of the semiconductor die 200, die stress is not fully eliminated during the curving process. The curving process creates a complex strain field in the semiconductor die 200, with different strain values at different areas of the semiconductor die 200 and different strain values along the length of the slits 205. These differing strain values cannot be accurately predicted using currently-available analytical calculations and/or simple simulation tools due to the complex strain fields used to determine the ideal slit shape.

Figure 3:
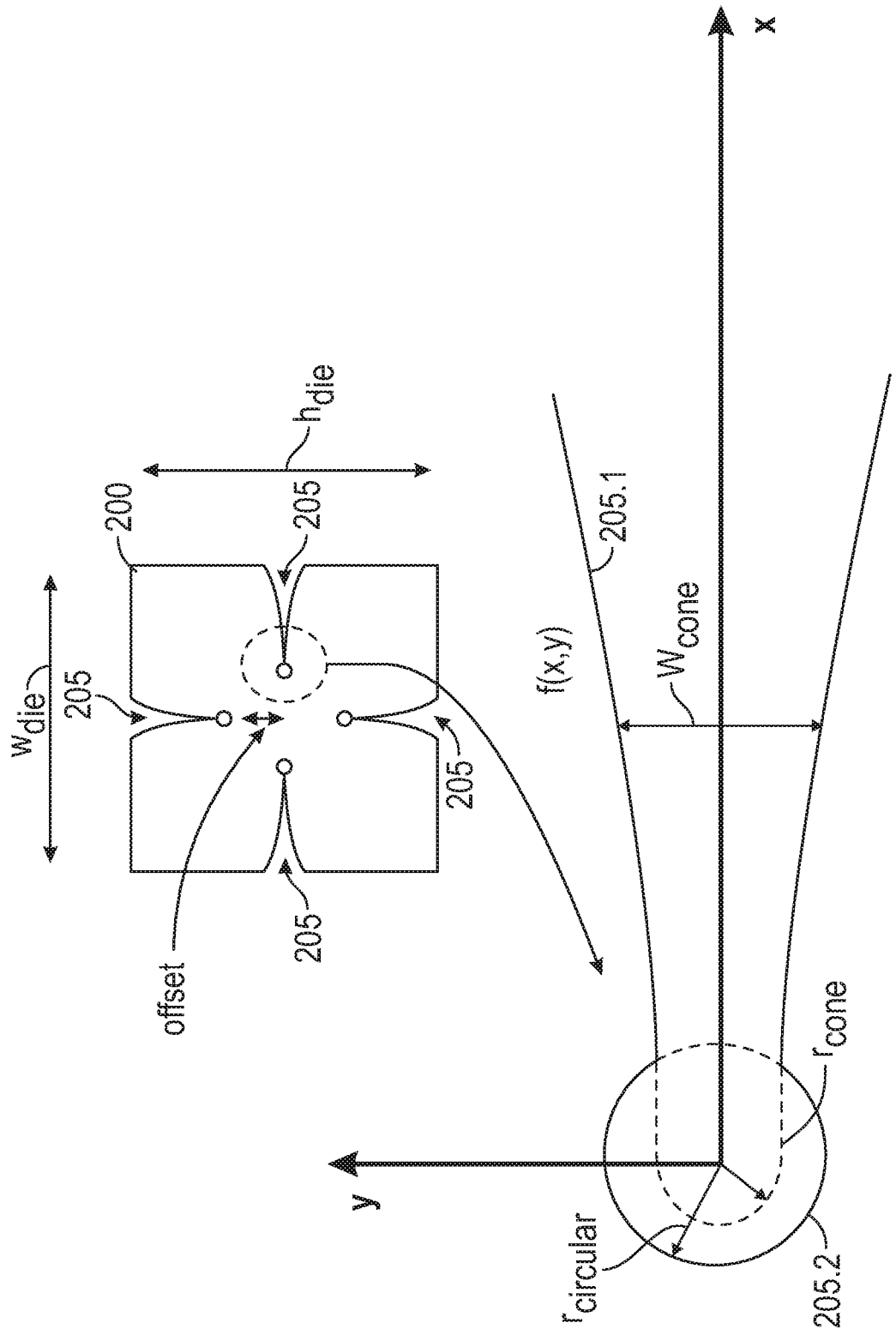
FIG. 3 is a schematic illustration of a semiconductor die of the imaging device shown in FIG. 2 and includes a close-up of a slit in the semiconductor die.

Referring to FIG. 3, the strain considerations of one of the slits 205 of the semiconductor die 200 are schematically illustrated. The slit 205 is designed such that, when the semiconductor die 200 is curved into its final shape, there is a near-zero gap (e.g., a near-zero seam) between adjacent pixel portions 210-213. In some embodiments, the desired gap (or seam) between the adjacent pixel portions 210-213 may be less than the pixel pitch. For example, using the above-described example embodiment in which the pixel pitch is in a range between about four microns and about five microns, the desired gap between the adjacent pixel portions 210-213 is equal to or less than about five microns. A gap larger than the pixel pitch may result in loss in image information.

The slit 205 may include a cone portion (e.g., a tapered portion) 205.1 and a circular portion (e.g., an inner circular portion) 205.2. The cone portion 205.1 of the slit 205 may have a decreasing width $W_{cone}$ from an edge of the semiconductor die 200 towards a center of the semiconductor die 200, but the present disclosure is not limited thereto. As will be further described below, the shape of the slit, including the shape of the cone portion 205.1 of the slit 205, is determined by iterative finite element analysis.

The circular portion 205.2 of the slit 205 is provided at the terminus of the slit 205 (e.g., at the terminus of the cone portion 205.1 of the slit 205). In some embodiments, radius $r_{circular}$ of the circular portion 205.2 may be greater than the expected radius $r_{cone}$ of the cone portion 205.1. Put another way, the radius $r_{circular}$ of the circular portion 205.2 may be greater than one-half the width $w_{cone}$ of the cone portion 205.1 directly adjacent where the cone portion 205.1 and the circular portion 205.2 meet. The circular portion 205.2 allows for more complete closure of the slit (e.g., allows for a reduced gap between the pixel portions 210-213) during the curving process of the semiconductor die 200. In some embodiments, however, $r_{circular}$ and $r_{cone}$ may be the same such that the circular portion 205.2 appears as the natural terminus of the cone portion 205.1. Both the shape of the cone portion 205.1 (shown as f(x,y) in FIG. 3) and the radius $r_{circular}$ of the circular portion 205.2 of the slit 205 are determined in view of the mold radius (e.g., the radius of the mold that will be used to curve the semiconductor die 200), the semiconductor die 200 dimensions (e.g., $w_{die}$ and $h_{die}$ in FIG. 3), the semiconductor die 200 shape, and the compressive, tensile, and shear loads in the semiconductor die 200 during the curving process.

Figure 4:
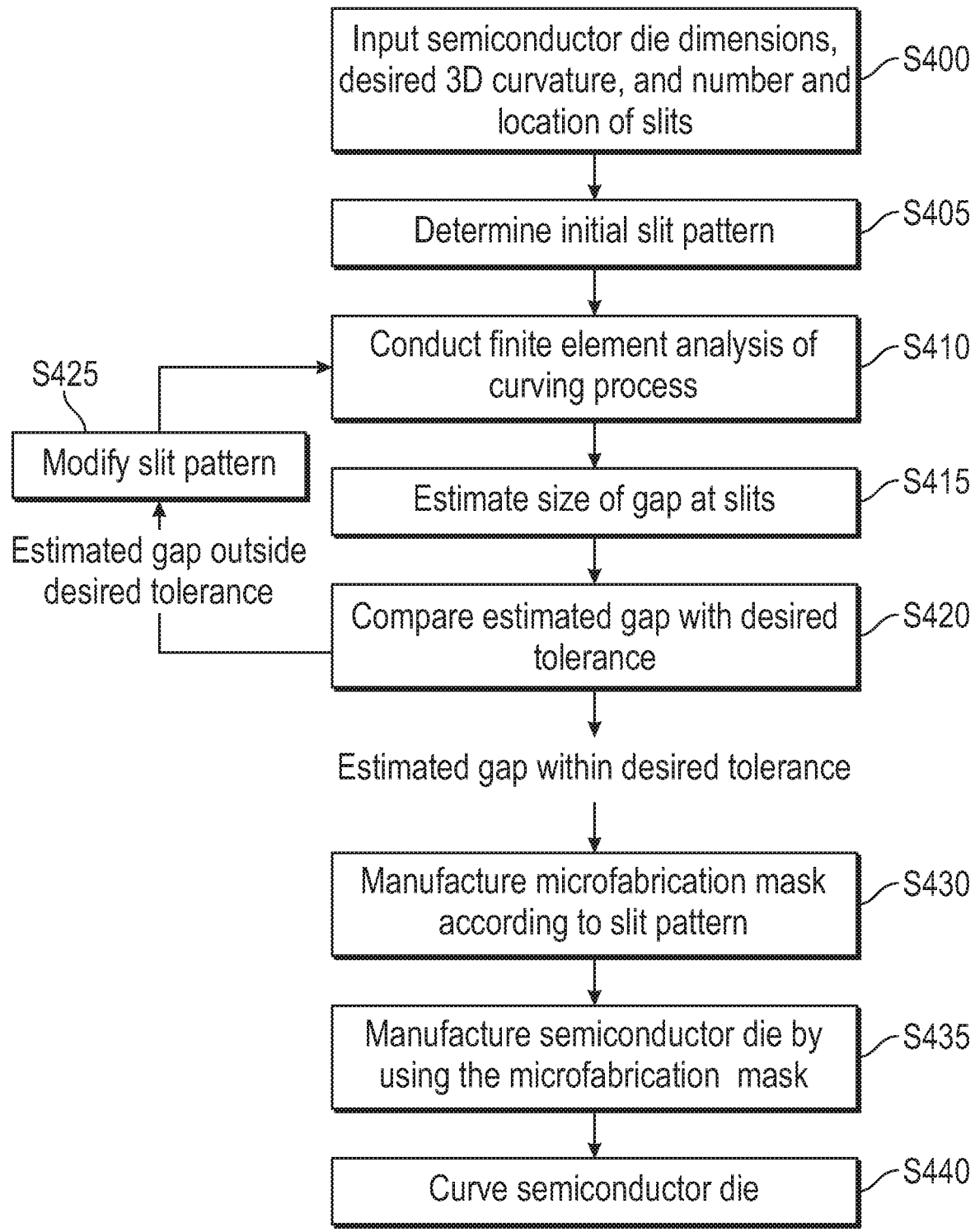
FIG. 4 is a flowchart illustrating a method of manufacturing a curved semiconductor die according to an embodiment of the present disclosure.

Hereinafter, a method for determining an optimal slit shape for a curved semiconductor die will be described. First, an initial semiconductor die design including various data is input into a computer running finite element analysis software (e.g., a finite element analysis program) (S400) in FIG. 4. The data may include, but is not limited to, the semiconductor die shape and dimensions, including thickness, width, and height, the desired final three-dimensional curvature of the semiconductor die, and the number and location of slits in the semiconductor die. When the desired curvature is a partial spherical curvature, the radius of the desired partial spherical curvature may be the only necessary data relating to the desired final three-dimensional curvature of the semiconductor shape.

Next, an initial slit pattern is determined based on the input data (S405). To determine the initial slit pattern, simplified strain estimates based on the radius of the desired partial spherical curvature and the estimated strain at the edge of the semiconductor die may be used.

Figure 5A:
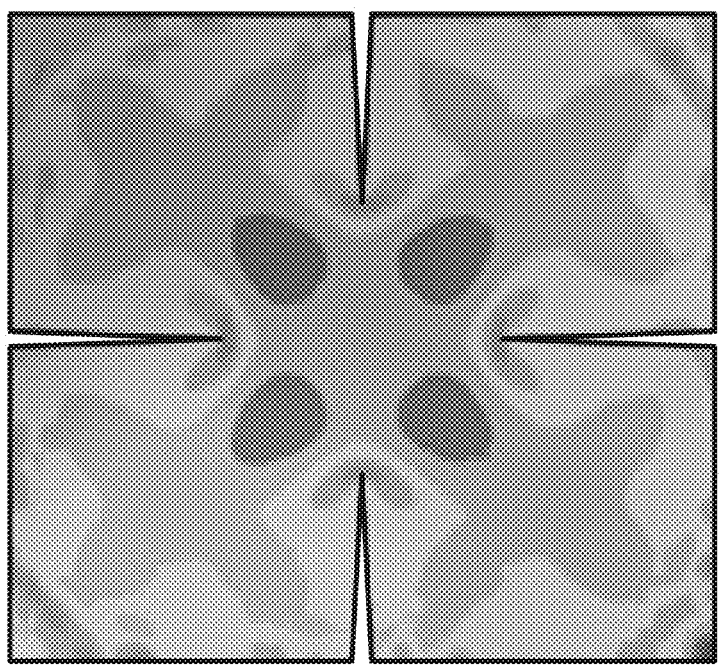
FIG. 5A is a finite element analysis of a curved semiconductor die having an initial slit pattern.

Then, a finite element analysis (e.g., a finite element simulation) of the curving process of the semiconductor die having the initial slit pattern is performed by the computer (S410). The results of the analysis include the final shape of the semiconductor die having the desired partial spherical or other desired curvature, including the final position of the edges of the slits 205. FIG. 5A shows an example result of the finite element analysis of a semiconductor die having an initial slit pattern. In FIG. 5A, the red and orange colors indicate areas of higher stress concentrations while the yellow and green colors indicate areas of lower stress concentrations. Based on the result of the finite element analysis, the estimated size of the gap between the pixel portions 210-213 is determined (S415).

The estimated size of the gap between the pixels portions 210-213 is compared with the desired tolerance (S420). As discussed above, the desired tolerance may be equal to or less than the pixel pitch of the pixels 201 on the semiconductor die 200. The present disclosure, however, is not limited thereto, and the desired tolerance may suitably vary depending on the application for the semiconductor die, the desired accuracy of the imaging device using the semiconductor die, etc.

Figure 5B:
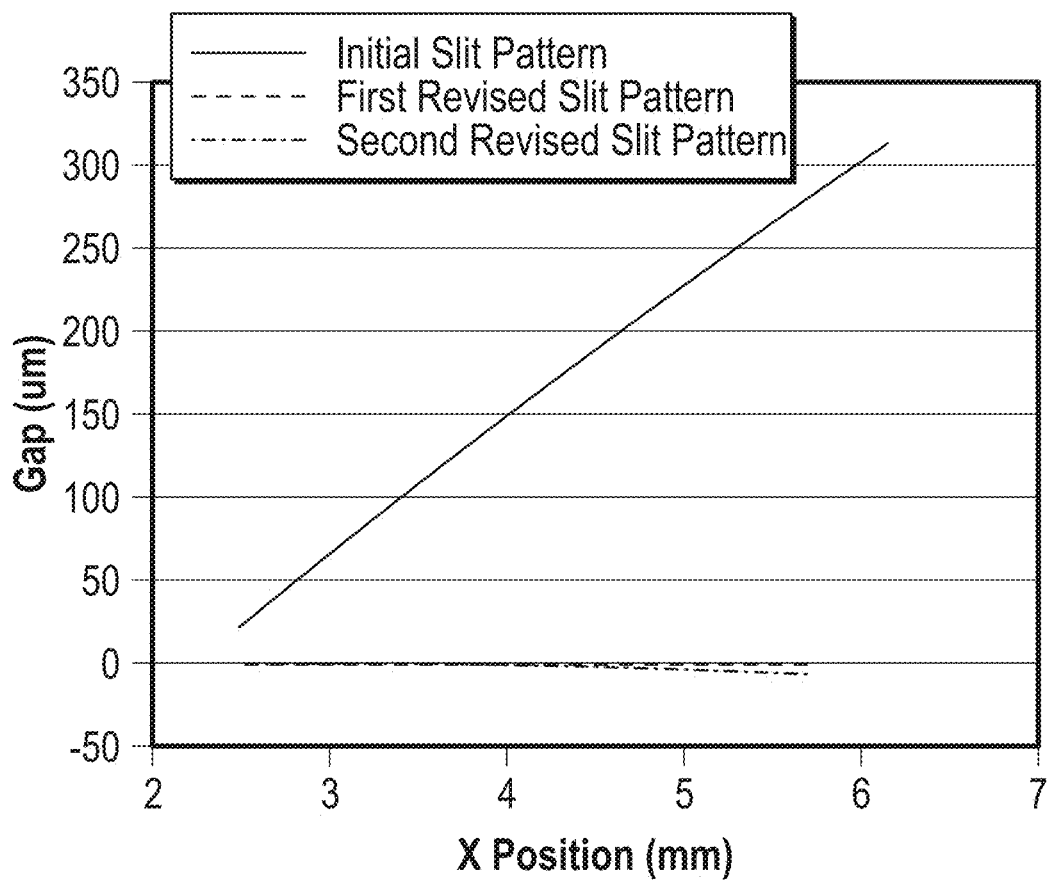
FIG. 5B is a graph showing an estimated gap at the slit of the semiconductor die after curving the semiconductor die with the initial slit pattern, first revised slit pattern, and second revised slit pattern.

As can be seen in FIG. 5A, the finite element analysis of the curved semiconductor die with the initial slit pattern shows a relative large gap at the slits that grows approximately linearly from the terminus of the slit toward the edge of the semiconductor die. Referring to FIG. 5B, the estimated size (e.g., the estimated width) of the gap is shown as a function of distance from the center of the semiconductor die. As can be seen, the gap grows approximately linearly toward the edge of the semiconductor die. Based on the initial slit pattern, the estimated gap according to the finite element analysis is about 315 microns at the edge of the semiconductor die.

When the estimated gap is outside the desired tolerance, the initial slit pattern is refined (e.g., is modified and/or adjusted) in view of the estimated gap and the shape of the gap (S425). Modifying the slit pattern (S425) may include modifying the shape of the cone portion 205.1 of the slit 205 and/or the radius of the circular portion 205.2 of the slit 205. In some embodiments, the offset from the center of the semiconductor die to the terminus of the slit 205 may be fixed (e.g., may not be modified), but in other embodiments, the offset may be an adjustable variable within a suitable range. After the slit pattern is modified (S425), another finite element analysis is conducted on the curving process for the curved semiconductor die with the modified slit pattern (S410). The size of the gap is then measured using the result of the finite element analysis based on the modified slit pattern (S415), and the size of the estimated gap is compared with the desired tolerance (S420).

When the estimated gap is again outside the desired tolerance, the slit pattern is again modified (S425), the finite element analysis is re-run (S410), and the size of the estimated is gap measured (S415) and compared with the desired tolerance (S420). These acts are iteratively performed until the estimated gap is within the desired tolerance.

Referring back to FIG. 5B, the dash-dash line illustrates the estimated gap in a semiconductor die with a first revised slit pattern. As can be seen, the gap is substantially smaller than in the semiconductor die with the initial slit pattern and is in a range between about zero microns to about negative one micron over the length of the slit 205. Here, a negative value indicates that the pixel portions 210-213 overlap each other in the curved state.

Figure 5C:
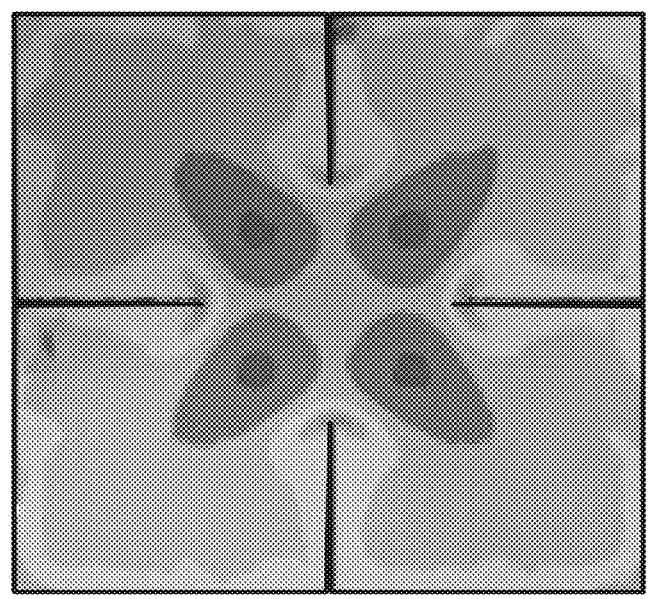
FIG. 5C is a finite element analysis of the curved semiconductor die having the second revised slit pattern.

When the estimated gap is within the desired tolerance, the slit pattern is used to manufacture a microfabrication mask (S430). Referring to FIG. 5C, a finite element analysis of a second revised slit pattern is shown. As can be seen, there is no visible gap between the pixel portions 210-213, and referring to FIG. 5B, the gap of the second revised slit pattern is in a range of about zero microns to about negative 5 microns. Similar to FIG. 5A, the red and orange colors in FIG. 5C indicate areas of higher stress concentrations while the yellow and green colors in FIG. 5C indicate areas of lower stress concentrations.

Figure 6A:
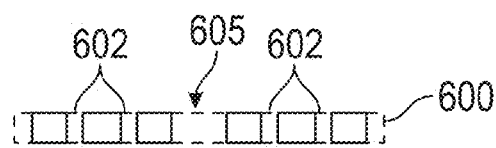
FIGS. 6A to 6C are schematic illustrations of a method of manufacturing a semiconductor die having a slit pattern according to an embodiment of the present disclosure.

Referring to FIG. 6A, the microfabrication mask 600 may be an etching mask for use in, as one example, a deep reactive-ion etch (DRIE) process. The present disclosure, however, is not limited thereto. The microfabrication mask 600 may include a plurality of openings (e.g., slits) therein including slit openings 605 that correspond with the slits 205 to be formed in the semiconductor die 200 and pixel definition openings 602 that correspond with pixel definition grooves 202 to be formed in the semiconductor die 200. The slit openings 605 in the microfabrication mask 600, which correspond to the slits 205 in the semiconductor die 200, may be wider than the pixel definition openings 602 in the microfabrication mask 600, which correspond to the pixel definition grooves 202 in the semiconductor die 200.

Figure 6B:
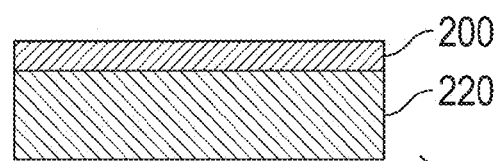

Referring to FIG. 6B, the semiconductor die 200 may be manufactured (e.g., may be etched) by using the microfabrication mask 600 (S435). For example, the semiconductor die 200 may be on (e.g., formed on, placed on, or adhered to) a substrate 220, and the microfabrication mask 600 may be arranged over the semiconductor die 200. Then, an exposed surface of the semiconductor die 200 may be exposed to an etchant through the microfabrication mask 600 to pattern the semiconductor die 200. For example, the etching process may form the slits 205 and the pixel definition grooves 202 in the semiconductor die 200. Because the slits 205 are wider than the pixel definition grooves 202, when the semiconductor die 200 is etched for an amount of time, the pixel definition grooves 202 are formed shallower than the slits 205 such that the pixel definition grooves 202 do not extend entirely through the semiconductor die 200 while the slits 205 do extend through the semiconductor die 200. Put another way, because the slits 205 are wider than the pixel definition grooves 202, the slits 205 may be etched deeper than the pixel definition grooves 202 even though they are formed during a single etching process and for a same amount of time. By this process, a single etching process forms both the slits 205 and the pixel definition grooves 202 in the semiconductor die 200, thereby expediting the manufacturing cost and reducing the time required to manufacture the semiconductor die 200. In some embodiments, such as in silicon-based imaging sensors, the slit 205 may extend entirely through the substrate 220 as well as entirely through the semiconductor die 200.

The present disclosure is not limited to the above-described method of manufacturing the semiconductor die 200. For example, as may be known to those skilled in the art, different processes may be used to manufacture silicon-based CMOS imaging sensors for detecting visible and/or near infrared light. The above-described method of manufacturing the semiconductor die 200 may be used to, for example, manufacture an imaging sensor for detecting infrared light, but the present disclosure is not limited thereto.

Figure 6C:
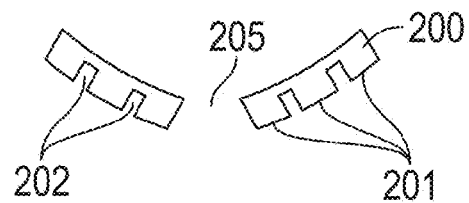

Referring to FIG. 6C, the semiconductor die 200 is then curved (S440). The substrate 220 may be substantially removed from the semiconductor die 200 before the curving thereof, may be removed from the semiconductor die 200 after the curving thereof, or may be curved with the semiconductor die 200 and left adhered thereto. For example, a relatively thin of the substrate 220 may be left on the semiconductor die 200 to stabilize the semiconductor die. In some embodiments, the semiconductor die 200 may be about 20 to about 50 times thicker than the remaining substrate 220. The depth of the slit 205 in the substrate 200 may be determined such that, after thinning (e.g., etching) of the substrate 200, the slit 205 extends entirely through the remaining thin layer of the substrate 200.

As one example, pneumatic curving may be used to curve the semiconductor die 200 (S440). In pneumatic curving, the semiconductor die 200 may be arranged in or over a die having the desired partial spherical curvature, and a membrane may be arranged over the semiconductor die 200 such that the semiconductor die 200 is between the die and the membrane. Then, pressure is applied to the exposed surface of the membrane and/or vacuum is introduced below the membrane, thereby pushing and/or pulling the membrane into contact with the semiconductor die 200 to spherically curve the semiconductor die 200 along the die to have the desired partial spherical curvature. One example of pneumatic curving is called free-edge semiconductor die curving. The semiconductor die 200 may be curved such that the exposed surface of the semiconductor die 200 has a concave shape. However, the present disclosure is not limited thereto.

The curved semiconductor die 200 may be attached to a package, such as a ceramic leadless chip carrier (CLCC) or the like. The package may assist with maintaining the semiconductor die 200 in the partially curved state and may also provide electrical inputs and outputs.

Certain components of the imaging device, such as the readout circuit, and/or any other relevant devices or components according to embodiments of the present invention described herein may be implemented utilizing any suitable hardware, firmware (e.g. an application-specific integrated circuit), software, or a combination of software, firmware, and hardware. For example, the various components of the imaging device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the terms "exemplary" and "example" are intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a method of manufacturing a curved semiconductor die have been described and illustrated herein, many modifications and variations within those embodiments will be apparent to those skilled in the art. Accordingly, it is to be understood that a method of manufacturing a curved semiconductor die according to the present disclosure may be embodied in forms other than as described herein without departing from the spirit and scope of the present disclosure. The present disclosure is defined by the following claims and equivalents thereof.

What is claimed is:

1. A method of manufacturing a curved semiconductor die, the method comprising:
   designing a semiconductor die design by conducting finite element analysis of an initial semiconductor die design having a partial spherical curvature, the initial semiconductor die design comprising a shape of a semiconductor die and a location and shape of a slit in the semiconductor die;
   when a size of a gap at the slit in the curved semiconductor die is outside a tolerance, modifying the initial semiconductor die design to provide a revised semiconductor die design and conducting another finite element analysis of the revised semiconductor die design;
   when the size of the gap at the slit in the curved semiconductor die is within the tolerance, manufacturing a microfabrication mask utilizing the initial semiconductor die design or the revised semiconductor die design having the size of the gap within the tolerance;
   forming a semiconductor die by utilizing the microfabrication mask; and
   curving the semiconductor die to have the partial spherical curvature.

2. The method of claim 1, further comprising iteratively modifying the initial semiconductor die design and conducting the finite element analysis until the size of the gap at the slit is within the tolerance.

3. The method of claim 1, wherein the forming of the semiconductor die comprises etching the semiconductor die.

4. The method of claim 3, wherein the curving of the semiconductor die comprises pneumatic curving.

5. The method of claim 3, wherein the initial semiconductor die design further comprises lateral dimensions of the semiconductor die, thickness of the semiconductor die, and the partial spherical curvature.

6. The method of claim 5, wherein the shape of the slit comprises a cone portion and a circular portion.

7. The method of claim 6, wherein a radius of the circular portion of the slit is greater than one-half a width of the cone portion at where the cone portion meets the circular portion.

8. The method of claim 1, wherein the modifying of the initial semiconductor die design comprises modifying the shape of the slit.

9. The method of claim 1, wherein the modifying of the initial semiconductor die design comprises modifying the location of the slit.

10. The method of claim 1, wherein the modifying of the location of the slit comprises modifying an offset from a terminus of the slit to a center of the semiconductor die.

11. A method of manufacturing an imaging device, the method comprising:
conducting a first finite element analysis on a curved semiconductor die design comprising a slit;
estimating a size of a gap in the curved semiconductor die design at the slit by utilizing the first finite element analysis;
when the size of the gap is greater than a tolerance:
modifying a shape and/or a location of the slit in the curved semiconductor die design and conducting a second finite element analysis; and
estimating the size of the gap in the curved semiconductor die design at the slit by utilizing the second finite element analysis; and
when the size of the gap is less than the tolerance, manufacturing a focal-plane array according to the curved semiconductor die design or the modified curved semiconductor die design having the gap that is less than the tolerance.

12. The method of claim 11, wherein the manufacturing of the focal-plane array comprises manufacturing a microfabrication mask according to the curved semiconductor die design or the modified curved semiconductor die design having the gap that is less than the tolerance and etching a semiconductor die by utilizing the microfabrication mask.

13. The method of claim 12, wherein the etching of the semiconductor die comprises etching a plurality of pixel definition grooves and the slit in the semiconductor die.

14. The method of claim 13, wherein the pixel definition grooves have a depth that is less than a thickness of the semiconductor die, and
wherein the slit extends through the semiconductor die.

15. The method of claim 11, wherein the focal-plane array comprises a plurality of pixels, and
wherein the tolerance is equal to or less than a pitch between two adjacent ones of the pixels.

16. A method of manufacturing a curved semiconductor die, the method comprising:
designing a semiconductor die design by conducting a finite element analysis simulation of curving an initial semiconductor die design from a flat state into a curved state having a partial spherical curvature, the initial semiconductor die design comprising lateral dimensions of a semiconductor die, shape and location of a slit in the semiconductor die, and a radius of the partial spherical curvature of the semiconductor die;
measuring a gap at the slit in the simulated curved semiconductor die design according to the initial semiconductor die design;
when the gap is outside a tolerance, modifying the initial semiconductor die design to provide a first revised semiconductor die design, conducting another finite element analysis simulation utilizing the first revised semiconductor die design, and measuring the gap at the slit in the simulated curved semiconductor die design according to the first revised semiconductor die design; and
manufacturing a curved semiconductor die according to the initial semiconductor die design when the gap at the slit of the initial semiconductor die design is within the tolerance or according to the first revised semiconductor die design when the gap at the slit of the initial semiconductor die design is outside the tolerance and the gap at the slit of the first revised semiconductor die design is within the tolerance.

17. The method of claim 16, wherein the manufacturing of the curved semiconductor die comprises:
forming a microfabrication mask having a plurality of openings therein;
etching a semiconductor die by utilizing the microfabrication mask; and
curving the etched semiconductor die.

18. The method of claim 17, wherein the etching of the semiconductor die comprises etching a slit through the semiconductor die.

19. The method of claim 17, wherein the curving of the etched semiconductor die comprises a pneumatic curving process.

20. The method of claim 16, further comprising, when the gap at the slit of the first revised semiconductor die design is outside the tolerance, modifying the first revised semiconductor die design to provide a second revised semiconductor die design, conducting another finite element analysis simulation utilizing the second revised semiconductor die design, and measuring the gap at the slit in the simulated curved semiconductor die design according to the second revised semiconductor die design.

* * * * *